United States Patent [19]

Moore

[11] Patent Number: 5,077,908

[45] Date of Patent: Jan. 7, 1992

[54] APPARATUS FOR MEASURING THE ROUNDNESS OF A SURFACE OF AN OBJECT

[76] Inventor: David Moore, 28 Bridle Path Rd., Elmsthorpe, Leicester LE9 7SA, England

[21] Appl. No.: 542,986

[22] Filed: Jun. 25, 1990

[51] Int. Cl.$^5$ .......................... G01B 5/20; G01B 5/08; G01B 7/28; G01B 7/12

[52] U.S. Cl. ..................................... 33/550; 33/555.3

[58] Field of Search .............. 33/550, 552, 555, 555.1, 33/555.3, 501.07, 501.1, 551, 553, 554, 549

[56] References Cited

U.S. PATENT DOCUMENTS

| | | | |
|---|---|---|---|
| 2,408,672 | 10/1946 | Mennesson | 33/555.3 |
| 2,548,010 | 4/1951 | Frisz | 33/555.3 |
| 2,572,999 | 10/1951 | Elliott | 33/555.3 |
| 2,603,043 | 7/1952 | Bontemps | 33/555.3 |
| 3,274,693 | 9/1966 | Witzke | 33/555.3 |
| 3,479,744 | 11/1969 | Howland et al. | 33/551 |
| 4,141,149 | 2/1979 | George et al. | 33/555.3 |
| 4,903,413 | 2/1990 | Bellwood | 33/555.1 |

FOREIGN PATENT DOCUMENTS 2185818  7/1987  United Kingdom ............... 33/555.3

*Primary Examiner*—William A. Cuchlinski, Jr.
*Assistant Examiner*—C. W. Fulton
*Attorney, Agent, or Firm*—Young & Thompson

[57] ABSTRACT

The apparatus comprises a bifurcated head rotatably mounted upon a spring loaded arm. The head has two edge plates which can be brought into tangential contact with the periphery of a rotating object. When the head is brought into contact with objects of different diameters, the points of contact with the edge plates progress along location locus lines which, when produced, intersect an an apex. A displacement transducer mounted upon the head has a spring loaded plunger with a probe which is contacted to and detects inaccuracies upon the periphery of the object. In order to accommodate test objects of different diameters, the displacement transducer is bodily movable along an axis of adjustment relative to the head. The point of contact between the probe and test object will, between objects of different diameter, progress along a straight measurement locus line parallel to or coincident with the axis of adjustment. This measurement locus line passes through the apex but does not bisect the included angle between the location locus lines. This arrangement is mechanically simple yet gives unequal angular spacings between the points of contact which do not depend on the diameter of the test object. This facilitates the application of accurate harmonic (Fourier) reconstruction of the roundness profile of the test object. No precision turntable or spindle is required and the method is therefore suitable for in situ measurement. The diameter of the test object need not be known.

10 Claims, 7 Drawing Sheets

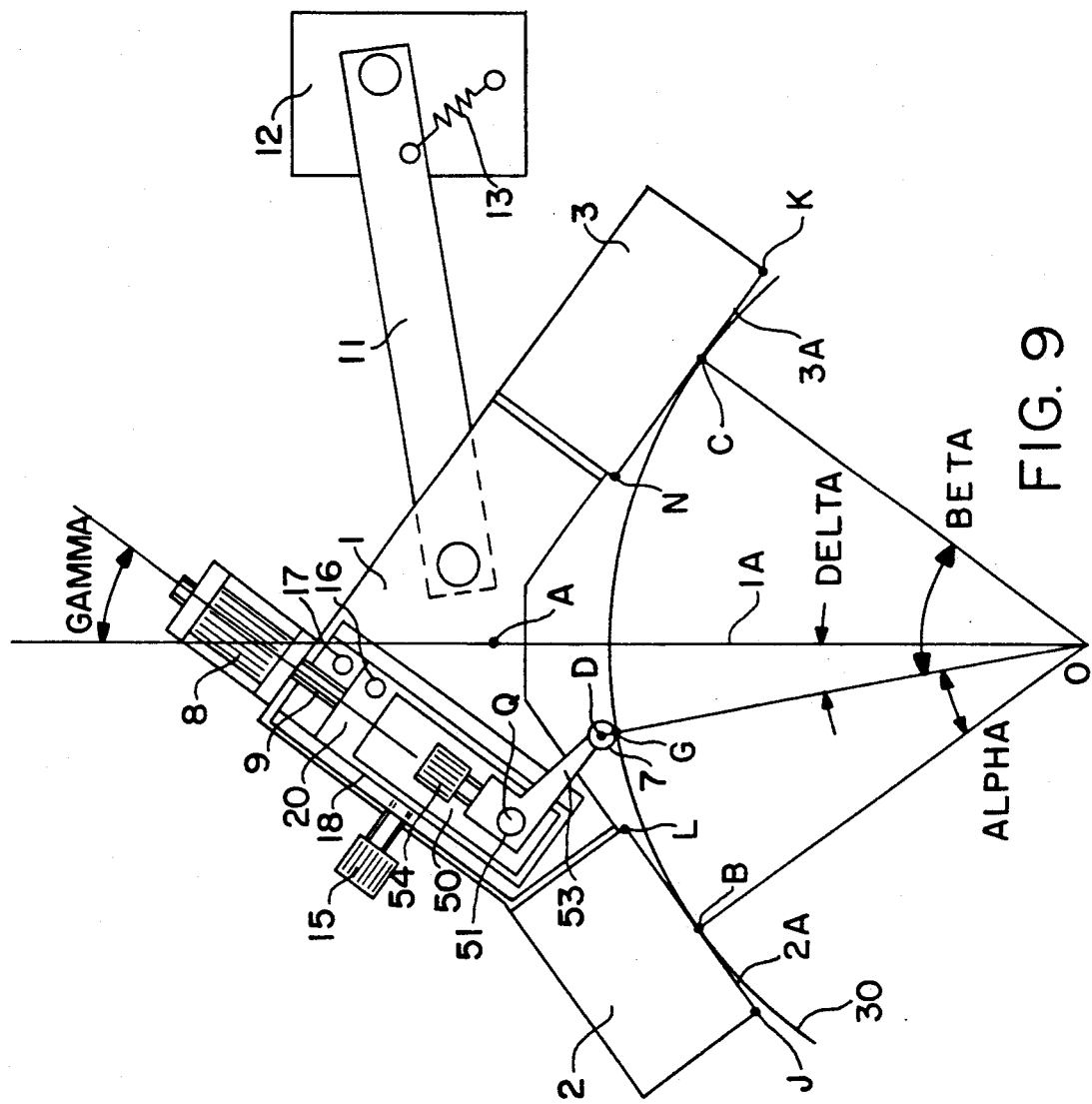

APPARATUS FOR MEASURING THE ROUNDNESS OF A SURFACE OF AN OBJECT

This invention relates to an apparatus for measuring the roundness of a surface of an object.

The performance and durability of many industrial products greatly depends upon the departures from truly round form of components having nominally round e.g. cylindrical and spherical surfaces. In general, for engineering components, these departures from roundness are small, or very small, compared with the diameter. Devices for the measurement of departures from roundness are widely used in industry and elsewhere, and are of various forms.

The subsequent descriptions indicate various known methods of measuring the roundness of a cylindrical object (to be termed the test object). The measurement of objects having other shapes e.g. spherical are in general performed in a like manner.

Known roundness measurement methods are performed using a displacement sensing device, generally termed a displacement transducer. For roundness measurement, most such displacement transducers have or are linked to a sensing member which is contacted to the surface of the test object. The movements of this sensing member with respect to the displacement transducer cause changes in the displacement indication from the transducer. However, some known displacement transducers have a sensing member which does not contact the test object, the displacement indication relating instead to the distance of the sensing member from the test object surface. The use of this other type of known transducer is not described as it is generally used in a like manner.

One common known method of roundness accuracy measurement involves the use of a precision rotary table, upon which the test object is mounted. The sensing member of a displacement transducer contacts the periphery of the test object, so that as the test object rotates the departures of the test object from the round form are measured. This method has several limitations. The cylindrical axis of the test object must be approximately aligned with the rotational axis of the table. The bearings upon which the rotary table is mounted must be of high precision to avoid measurement errors, and so are expensive. Moreover, such bearings generally have modest load capacities, preventing the roundness measurement of heavy test objects.

An alternative known method involves the use of a precision rotary spindle, the test object being mounted on a fixed table, and the axes of the spindle and test object being approximately aligned. The spindle has a cranked portion on which a displacement transducer is mounted. The sensing member of the displacement transducer contacts the periphery of the test object and is rotated about the test object. If lengthy test objects are to be measured, this method requires a lengthy cranked transducer mounting arm which is liable to flexure, and which accentuates spindle bearing errors.

A further known alternative method (to be termed the multiple contact method) avoids the need for precision rotary tables or precision spindles and can yield useful results even if the test object is rotated upon bearings of poor quality. This is a major advantage, as it allows roundness measurements to be performed in situ. Components may be measured during the manufacturing process without removal from the manufacturing machine. Components may also be measured during the servicing of machinery without the need for extensive disassembly. A further advantage is that in many instances the apparatus may be made smaller and cheaper than that required for either of the alternatives described above. The method involves the use of a measuring device (to be termed a measuring head) which contacts the test object at several locations spaced about its periphery, and incorporates one or more displacement transducers. Those contacts used for measurement are arranged to lie upon one transverse section of the test object.

In simpler known arrangements, two members (to be termed location members) contact the test object and locate the measuring head upon the test object. The position of the measuring head is thus sensitive to the departures from roundness of the test object at these two contacts (to be termed location member contacts) which therefore act as both location and measuring contacts. The location members may be of any suitable form, but are commonly of part spherical form, or of a form having a straight edge which is arranged to make tangential contact with the test object. A single displacement transducer upon the head has a sensing member which contacts the test object (this contact is to be termed a sensing member contact) to give a total of three measuring contacts (such an arrangement is to be termed a simple measuring head). As the test object is rotated with respect to the measuring head, departures from truly round form result in displacements at the transducer corresponding to a weighted combination of the departures from roundness at the three measuring contacts. These displacements may then be used as an indication of the departures of the object from truly round form. However the displacements at the transducer do not in general correspond directly to the departure of the object from truly round form, as this simple measuring head introduces considerable distortion. A skilled operator may be able to interpret the transducer displacement indication to give an improved estimate of the actual departures from roundness of the test object, but often this is unreliable or impossible.

Alternative known types of measuring head, not of the simple form, may introduce less distortion than a simple measuring head. In one such type, two location members are again used for location of the measuring head upon the test object, and a single displacement transducer is again used. However, more than one sensing member is employed, these being contacted to the test object at positions spaced around its periphery, and their movements being transmitted as a weighted combination to the displacement transducer by means of a system of linkages. In another such type, two location members are again used for location of the measuring head upon the test object, but two or more displacement transducers are used, these being linked to sensing members contacted to the test object at positions spaced around its periphery. The displacement indications from these transducers, which are in the form of electrical signals, are merged according to a weighted combination to product a resultant displacement indication. A further known alternative merges the electrical signals from two simple measuring heads arranged upon one transverse section of the test object. All of these alternatives involve undesirable mechanical complexity.

More sophisticated devices use a simple measuring head having three measuring contacts, in conjunction with a signal processing technique which compensates for, and so largely removes, the distortion (to be termed the transfer function distortion) introduced by the measuring head, to give a closer indication of the departure of the test object from truly round form. The transfer function distortion is calculated, knowing the mechanical arrangement of the measuring head, and in particular the angular spacing of the measuring contacts with the test object, subtended at the centre of the test object. An appropriate inverse distortion is then applied to the displacement indication given by the measuring head, using the method of inverse filtering, so as largely to remove the transfer function distortion. Several methods of applying this inverse filtering may be used, including matrix methods, convolution using a Finite Impulse Response filter, and fast convolution using Fast Fourier transforms. All these examples are digital methods applied to sampled data. This approach employs a mechanically simple measuring head, which is a considerable advantage. The signal processing required may be conveniently performed by a microcomputer.

In employing this technique, problems are encountered in the design of a measuring head which yields accurate results after the inverse filtering has been applied, and which is suitable for test objects of different diameters. The behaviour of a measuring head in these respects is dependent upon the angles subtended by the measuring contacts at the centre of the test object, and the manner in which these angles vary with test objects of different diameters. Both of these aspects will now be considered.

In attempting to ensure that the predicted departures from roundness following the inverse filtering closely reflect the true form of the test object, a major consideration is that a simple measuring head will fail to detect certain forms of out of roundness in the test object. For these forms, the displacements at the measuring contacts effectively cancel each other so that the resultant transducer displacements are either very small, or indeed zero. This reduces the accuracy of the measurement process. Suitable selection of the angles subtended at the centre of the test object by the measuring contacts can alleviate this problem, but if these angles vary with test object diameter, then this approach is difficult. This problem of the insensitivity of the measuring head to certain forms of out of roundness is especially marked in those cases where the subtended angles are equal.

With some known designs of simple measuring head, the subtended angles ALPHA and BETA between the sensing member contact and the respective location member contacts vary with the test object diameter. This is a serious disadvantage, as it prevents their advantageous selection to alleviate the problem of insensitivity. Furthermore, the inverse filtering required is dependent upon the test object diameter, which may not be known without separate diametral measurement. This complicates the roundness measurement procedure, and places the onus for correct diametral measurement upon the operator. In some circumstances, for example when only a minor part of the circumference of the test object is accessible, such diametral measurement may be difficult or impossible.

With other possible designs of simple measuring head, the measuring head may be adjusted so that the subtended angles remain constant, but in order to make the appropriate adjustment, the test object diameter must be known.

Other known designs of simple measuring head ensure that the subtended angles are invarient with test object diameter. This is achieved by the use of two location members each having a straight edge which is arranged to make tangential contact with the test object. The location member contacts thus subtend an angle at the centre of the test object which is independent of the test object diameter. The sensing member of a displacement transducer is arranged to move on a line bisecting this subtended angle, so that ALPHA always equals BETA. Thus, the subtended angles are invariant, but also equal, this latter being a grave disadvantage in that it accentuates the problem of insensitivity.

A further known design ensures that the subtended angles are invariant with test object diameter, and furthermore are unequal. This is achieved by the use of two location members each having a straight edge which is arranged to make tangential contact with the test object. The location member contacts thus subtend an angle at the centre of the test object which is independent of the test object diameter. The sensing member also has a straight edge which is arranged also to make tangential contact with the test object. The orientation of the sensing member is controlled by a system of guides so that the included angles ALPHA and BETA remain constant. In this design, the contact between the sensing member and the test object changes its position upon the sensing member for test objects of different diameters.

This last mentioned arrangement involves considerable mechanical complexity. The sensing member must be oriented by a suitable system of guides which must maintain the orientation to a high degree of accuracy, and which must maintain that same orientation when the sensing member is replaced when it has become worn. Furthermore, the sensing member must be constrained so that the straight edge of the sensing member is coplanar with the straight edges of the location members. Little space may be available for such a guide system.

An alternative possible configuration which would avoid the problem of insensitivity encountered in the simple measuring head is the use of a measuring head having two or more displacement transducers and sensing members, used in conjunction with a modified form of signal processing which not only performs the inverse filtering but also merges the signals from the transducers into a single signal. If appropriately configured by suitable selection of subtended angles, it may be arranged that if one of the displacement transducers is insensitive to a given form of out of roundness, then at least one other transducer will be sensitive to that form of out of roundness. The signal processing takes account of the forms to which each transducer is insensitive and for these forms, reliance is placed upon the other, sensitive transducer or transducers. The modified signal processing thus involves not only the method of inverse filtering, but also involves the combination of the signals from two or more displacement transducers to give a roundness indication. In order to do this, the subtended angles between the measuring contacts must be known.

Measuring heads for which the sum of the subtended angles between the two location member contacts and any sensing member contact is less than 180 degrees are compact, and may easily be applied to the test object. However, if the sum of the subtended angles exceeds 180 degrees, then a split design may be needed to allow assembly of the measuring head around the test object. An advantage is that the transducer output may be greater than in the former case, although the problem of insensitivity to certain forms of out of roundness remains.

Whereas the multiple contact method described above has significant advantages when e.g. in situ measurement of the test object is desired and/or the test object is long and/or the test object is heavy, it is subject to the above drawbacks.

An aim of the present invention is to overcome the drawbacks of apparatus for carrying out the multiple contact method of roundness measurement by the provision of apparatus which has an adjustment facility to compensate for differences in the diameter of objects being tested. Moreover, the design of this adjustment facility is such that without requiring knowledge of the diameter of a particular test object, the subtended angles will be unequal and substantially invariant, allowing their advantageous selection to alleviate the problem of the insensitivity of the measuring head to certain types of out of roundness. There will therefore be no substantial variation in the accuracy of the test within a range of test object diameters. Furthermore, the mechanical arrangement of the apparatus of the present invention is simple, convenient and robust in comparison with the alternative means of performing this function.

In accordance with the present invention there is provided apparatus for measuring the roundness of a surface of a relatively rotating object, the apparatus comprising a head having a pair of location means angularly related such that when brought into contact with the peripheries of nominally round objects of different diameters points of contact between said location means and said objects will progress with respect to the head along straight, non-parallel location locus lines tangential to each object, means for aligning the head relative to an object to be measured such that the location locus lines lie in a common measurement plane to which the axis of relative rotation is perpendicular and at least one sensing means which is adjustable relative to the head along an axis of adjustment in or parallel to the measurement plane, this axis of adjustment being transverse to the bisector of the location locus lines, the sensing means having a sensing member mounted thereon to detect the periphery of an object being measured at a predetermined measurement point when the object is in contact with said location means and aligned, the arrangement being such that measurement points of objects of different diameters progress along a straight measurement locus line parallel to the axis of adjustment and passing through the intersection of the location locus lines.

The sensing means may be disposed between the location means within the acute or obtuse angle subtended by the location means at the centre of an object being measured.

Preferably the sensing means contacts the object at the measurement point and is responsive thereto.

Preferably the sensing means incorporates a probe which is convex about an axis normal to the measurement plane where the probe is adapted to contact the object at the measurement point.

The sensing means may comprise a sensing device on the head supporting a sensing member upon a bearing to allow limited reciprocative movement and the sensing member may be spring biassed so as, in use, to contact a probe of the sensing member to the object. In this arrangement the bearing supporting the sensing member may be a linear bearing and the linear axis of this bearing may be parallel to the measurement locus line.

Alternatively, the sensing means may comprise a sensing device linked to a sensing member which is mounted upon a linear bearing upon the head to allow reciprocative movement in a direction parallel to the measurement locus line, this sensing member being spring biassed so as, in use, to contact a probe of the sensing member to the object.

In yet another alternative construction the sensing means may comprise a sensing device linked to a sensing member which is mounted upon a bearing upon a support member, the support member being adjustable with respect to the head along an axis parallel to the measurement locus line, the bearing allowing limited reciprocative movement of the sensing member, the sensing member being spring biassed so as, in use, to contact a probe of the sensing member to the object.

In a further modification of the invention the sensing means may be responsive to the proximity of the measurement point.

Five embodiments of the invention will now be described by way of example with reference to the accompanying diagrammatic drawings, in which.

Figure 4:
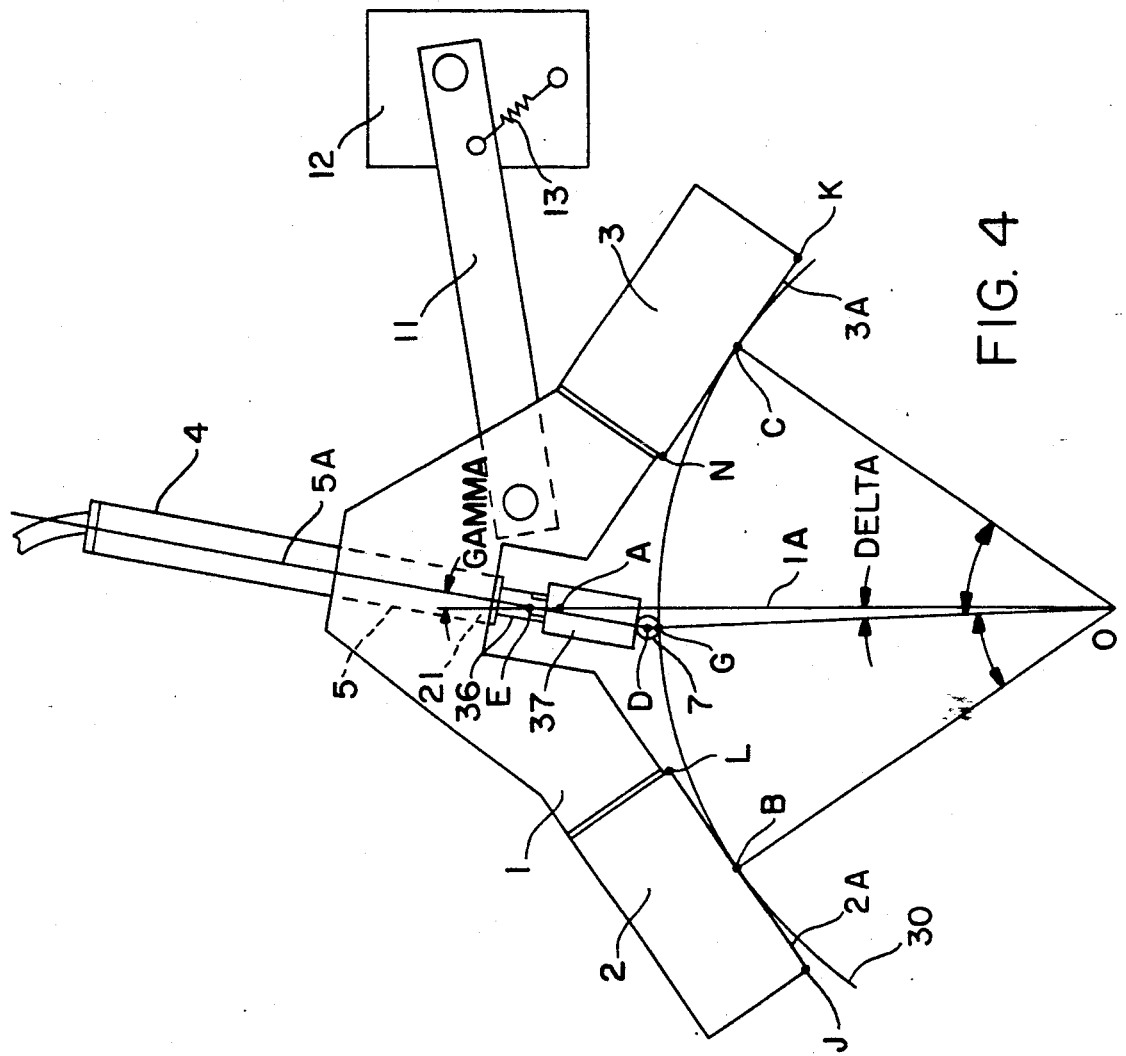
Figure 5:
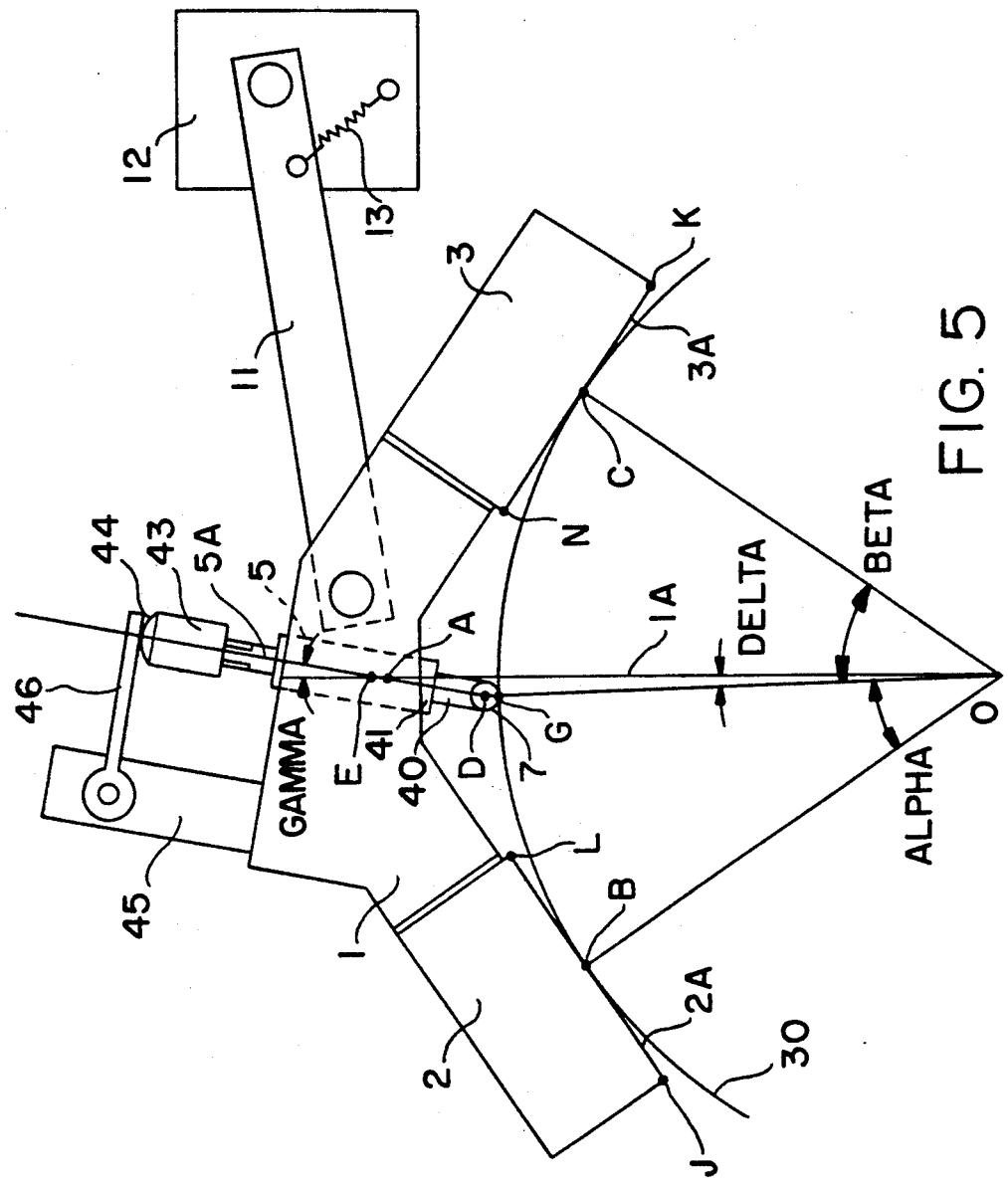
Figure 6:
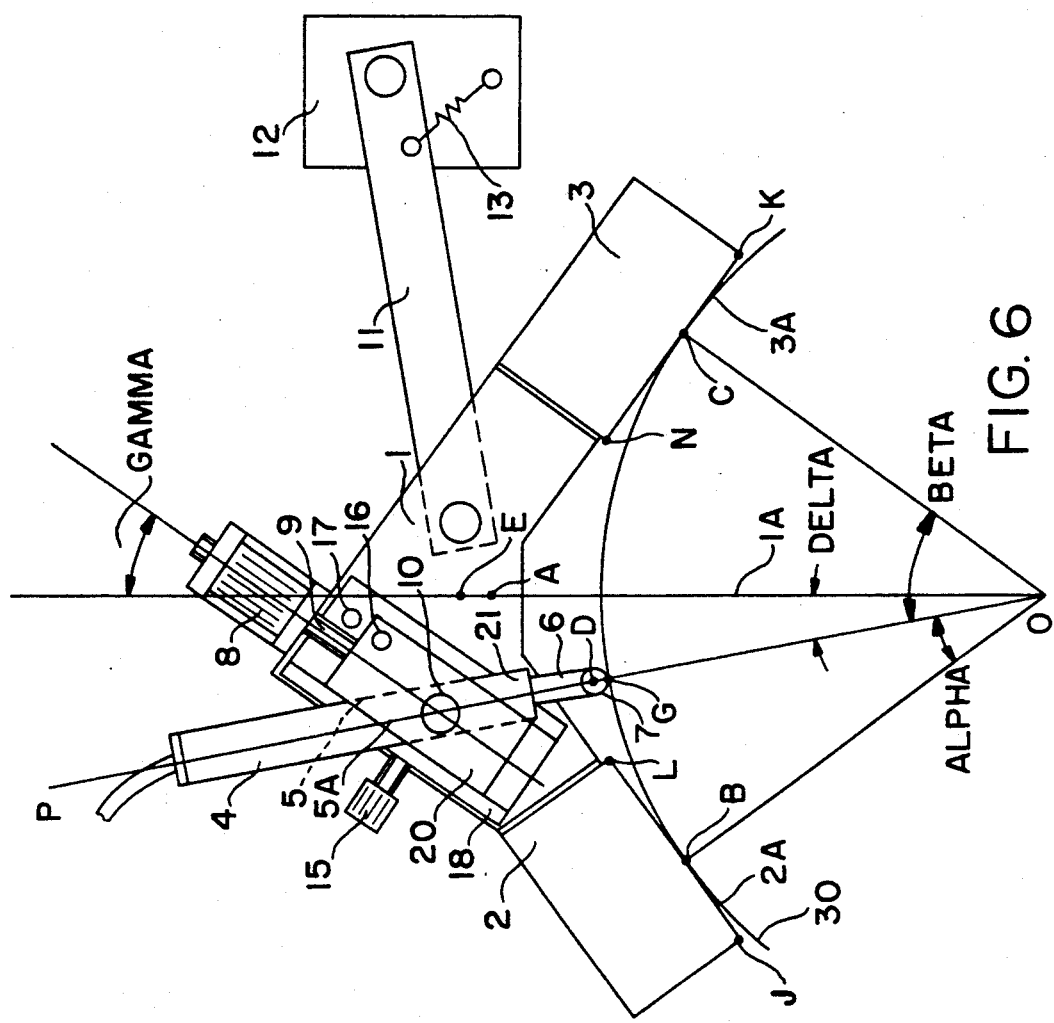
Figure 7:
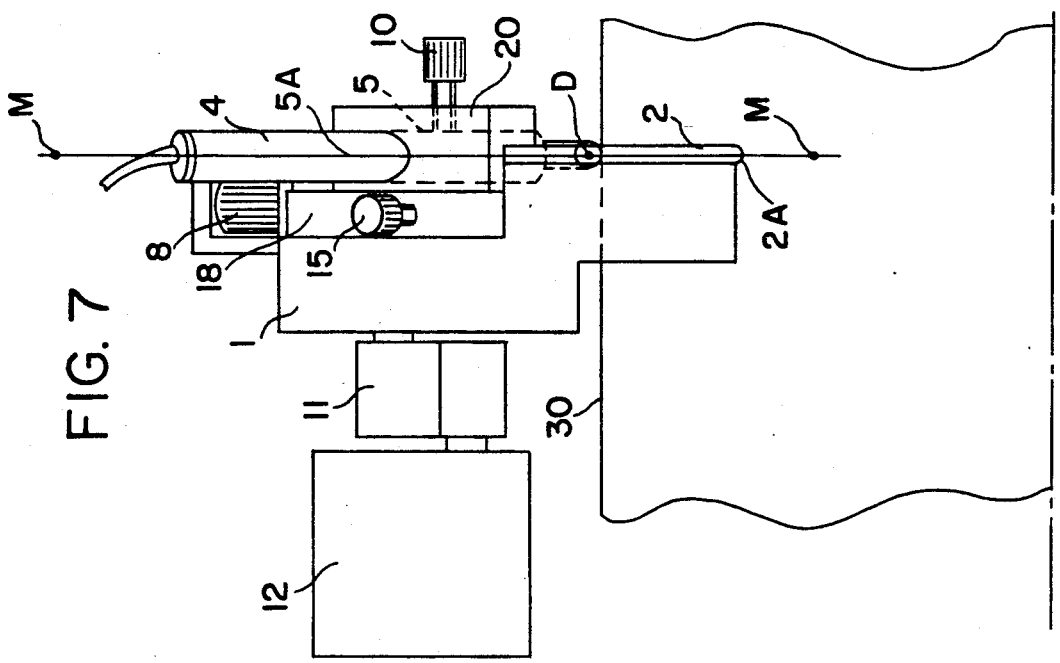
Figure 8:
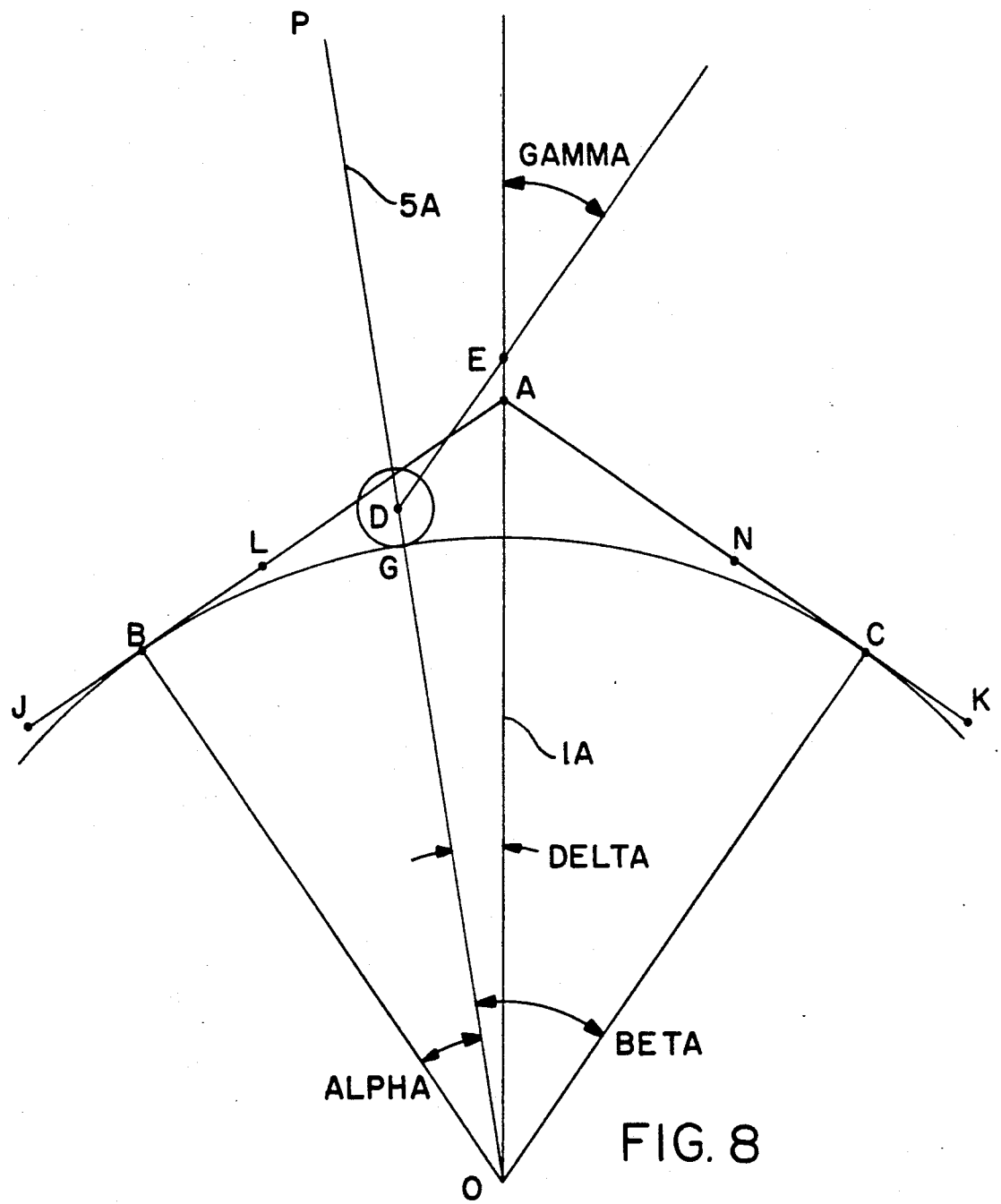

FIG. 4 is a front elevation of a second embodiment of apparatus in accordance with the invention mounted on a perfectly cylindrical test object, FIG. 5 is a front elevation of a third embodiment of apparatus in accordance with the invention mounted on a perfectly cylindrical test object, FIG. 6 is a front elevation and FIG. 7 is a side elevation of a fourth embodiment of apparatus in accordance with the invention mounted on a perfectly cylindrical test object, FIG. 8 is a diagram illustrating the geometry of the arrangement of FIGS. 6 and 7, and FIG. 9 is a front elevation of a fifth embodiment of apparatus in accordance with the invention mounted on a perfectly cylindrical test object.

Figures 1, 2:
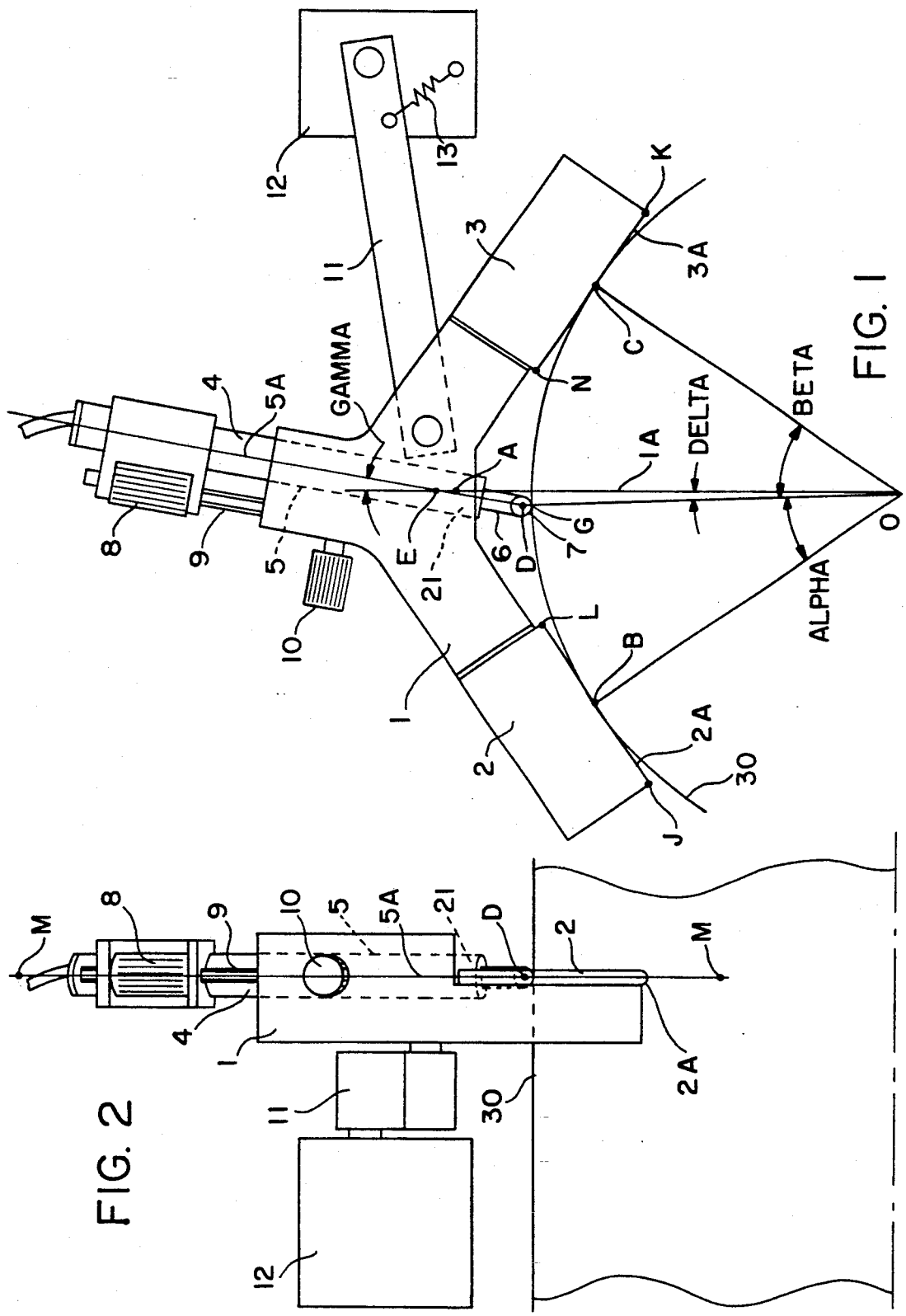
FIG. 1 is a front elevation and FIG. 2 is a side elevation of apparatus in accordance with the invention mounted on a perfectly cylindrical test object.
Figure 3:
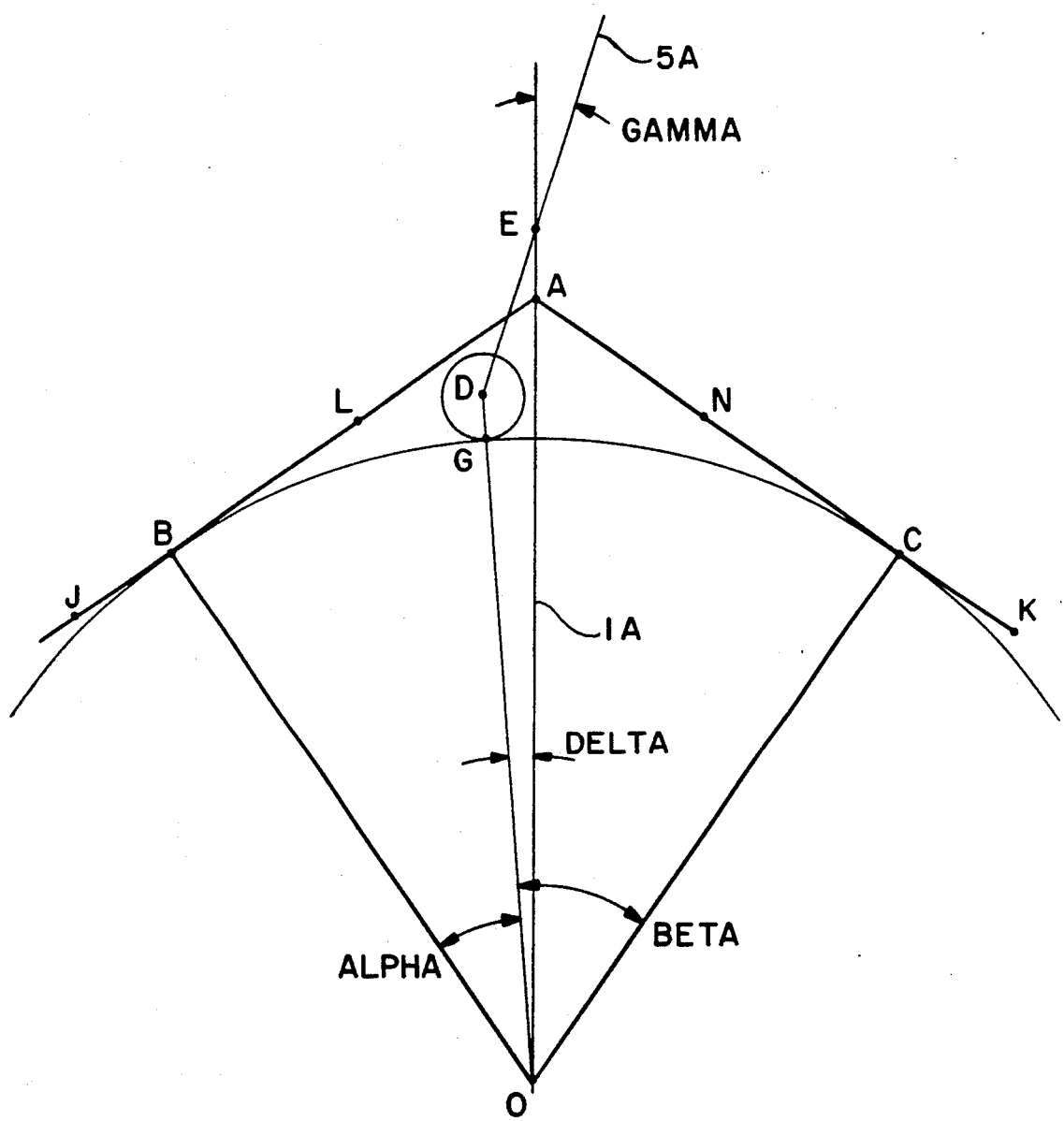
FIG. 3 is a diagram illustrating the geometry of the arrangement of FIGS. 1 and 2.

Referring first to FIGS. 1–3, a main body 1 of a measuring head is of aluminium alloy, upon which are secured edge-plates 2 and 3. Each edge-plate has one straight, wear resisting edge, 2A and 3A respectively, of semi-circular cross-section and is of tungsten carbide. The centres of curvature of these semi-circular edges 2A and 3A lie within the same plane M, termed the measurement plane. The measurement plane M intersects the semi-circular surfaces of the edges 2A and 3A at two straight lines, JL and KN. These two straight lines, representing location locus lines for objects of differing diameters, when produced, intersect at an apex A. The line which passes through the apex A, lies in the measurement plane M, bisects the angle between the lines JA and KA, and lies between the edges 2A and 3A is herein defined as the centre line 1A of the main body 1.

A linear variable differential transformer (LVDT) displacement transducer has a body 4 of cylindrical form and a cylindrical measuring plunger 6 which is free to slide axially into the body 4 upon a linear bearing 21 against a light spring force. Upon the free end of the measuring plunger 6 is mounted a spherical probe 7 of tungsten carbide. The cylindrical axis of the body 4 is colinear with the centre D of the spherical probe 7. The displacement indication from the displacement transducer depends upon the axial displacement of the spherical probe 7 with respect to the body 4 of the transducer.

The body 4 of the displacement transducer may slide within a close fitting bore 5 within the main body 1. Its axial position is controlled by a thumbwheel 8 which provides fine positional adjustment by means of a threaded rod 9. The body 4 of the displacement transducer may be fixed relative to the main body 1 by means of a pinch screw 10. The centre line 5A of the bore 5 lies within the measurement plane M.

The main body 1 is rotatably mounted, by ball bearings, upon a support arm 11 which is in turn rotatably mounted upon a mounting block 12. In operation, the mounting block 12 is secured to a suitable fixed support adjacent to the test object 30. The support arm 11 is loaded by means of a spring 13 so that the edges 2A and 3A are pressed against the test object 30. The attachment of the mounting block 12 is adjusted so that the measurement plane M is perpendicular to the cylindrical axis of the test object 30. The body 4 of the displacement transducer is then advanced by adjustment of the thumbwheel 8 until the spherical probe 7 is brought into contact with the test object 30. Movement of the body 4 is continued toward the test object 30 lightly and partially to compress the spring loading of the plunger 6 and to bring the displacement transducer into its linear working region. The body 4 of the displacement transducer is then fixed by means of the pinch screw 10.

The points of contact between the measuring apparatus and the test object 30 are B, C and G, which lie within the measurement plane M. Points B and C lie within the lines JA and KA respectively. The centre line 1A of the main body 1 passes through the centre O of the test object 30 and bisects the angle between the radii OB and OC. The centre line 5A of the bore 5 in which the transducer 4 slides is not parallel to the centre line 1A of the main body 1; rather it is inclined at an angle, indicated as GAMMA, to the centre line 1A of the main body 1, so that the angles ALPHA and BETA subtended by the arcs BG and GC at the centre O of the test object 30 are unequal. The radius OG is inclined at an angle DELTA to the centre line 1A of the main body 1.

The inclination, GAMMA, of the centre line 5A of the bore 5 to the centre line 1A of the main body 1 and the location E of the intersection of the centre line 5A of the bore 5 with the centre line 1A of the main body 1 must be appropriately chosen so that DELTA, and thus ALPHA and BETA, remain constant over a range of test object diameters.

The geometrical relationships indicated in FIGS. 1-3 and discussed above are those relating to a test object of perfectly cylindrical form. If the test object is not of perfectly cylindrical form, these geometrical relationships may not be exact. However, if the departures of the test object from perfectly cylindrical form are small then their effect upon the geometrical relationships, and in particular upon the angular spacing of the points of contact, is small.

In this embodiment, axial movement of the cylindrical body 4 of the displacement transducer with respect to the main body 1 of the measuring head provides the gross movement required to accommodate test objects of various different diameters. The much smaller reciprocative movements of the spherical probe 7 with respect to the main body 1 caused by departures from roundness in a test object give rise to axial displacement movements at the displacement transducer. The colinear arrangement of the body 4 of the displacement transducer and the spherical probe 7 obviates the need to rotationally align the body 4 of the displacement transducer with the main body 1.

The test object is then rotated about its cylindrical axis, and the output from the displacement transducer is recorded, either manually, or preferably automatically, at angular intervals. The inverse distortion may be applied to the data to provide an indication of the departures from roundness of the test object.

From the foregoing it will be seen that if the linear working region of the displacement transducer extends over a considerable distance, then the need for positional adjustment of the body 4 of the transducer with respect to the main body 1 of the measuring head will be minimised or even completely eliminated.

A second embodiment of the invention will now be described with reference to FIG. 4 of the accompanying drawings. Parts like or having a similar function to those of the first embodiment have been given like references.

Referring to FIG. 4, a main body 1 of a measuring head is of aluminium alloy, upon which are secured edge-plates, 2 and 3. Each edge-plate has one straight wear resisting edge, 2A and 3A respectively, of semi-circular cross-section, and is of tungsten carbide. The centres of curvature of these semi-circular edges 2A and 3A lie within the same plane, termed the measurement plane. The measurement plane intersects the semi-circular surfaces of the edges 2A and 3A at two straight lines, JL and KN. These two straight lines, representing location locus lines for objects of differing diameters, when produced, intersect at an apex A. The line which passes through the apex A, lies in the measurement plane, bisects the angle between the lines JA and KA, and lies between the edges 2A and 3A is herein defined as the centre line 1A of the main body 1.

A linear variable differential transformer (LVDT) displacement transducer has a body 4 of cylindrical form and a cylindrical measuring plunger 36 which is free to slide axially into the body 4 upon a linear bearing 21 against a light spring force. Over the free end of the measuring plunger 36 is a capped tubular thumbwheel 37 upon which is mounted a spherical probe 7. The thumbwheel 37 is attached to the measuring plunger 36 by a threaded arrangement so that the axial position of the spherical probe 7 with respect to the measuring plunger 36 may be adjusted by rotation of the thumbwheel 37. The cylindrical axis of the body 4 is colinear with the centre D of the spherical probe 7.

The body 4 of the displacement transducer is secured within a close fitting bore 5 within the main body 1. The centre line 5A of the bore 5 lies within the measurement plane.

The main body 1 is rotatably mounted, by ball bearings, upon a support arm 11 which is in turn rotatably mounted upon a mounting block 12. In operation, the mounting block 12 is secured to a suitable fixed support adjacent to the test object 30. The support arm 11 is loaded by means of a spring 13 so that the edges 2A and 3A are pressed against the test object 30. The attachment of the mounting block 12 is adjusted so that the measurement plane is perpendicular to the cylindrical axis of the test object 30. The spherical probe 7 is then advanced by adjustment of the thumbwheel 37 until the spherical probe 7 is brought into contact with the test object 30. Adjustment of the thumbwheel 37 is continued further, lightly and partially to compress the spring loading of the measuring plunger 36 and to bring the displacement transducer into its linear working region.

The geometrical relationships appertaining to this second embodiment are similar to those of the first embodiment.

In this second embodiment, axial movement of the spherical probe 7 with respect to the measuring plunger 36 provides the gross movement required to accommodate test objects of various different diameters. The much smaller reciprocative movements of the spherical probe 7 with respect to the main body 1 caused by departures from roundness in a test object give rise to axial displacement movements at the displacement transducer.

A third embodiment of the invention will now be described with reference to FIG. 5 of the accompanying drawings. Parts like or having a similar function to those of the first embodiment have been given like references.

Referring to FIG. 5, a main body 1 of a measuring head is of aluminium alloy, upon which are secured edge-plates 2 and 3. Each edge-plate has one straight, wear resisting edge, 2A and 3A respectively, of semi-circular cross-section, and is of tungsten carbide. The centres of curvature of these semi-circular edges 2A and 3A lie within the same plane, termed the measurement plane. The measurement plane intersects the semi-circular surfaces of the edges 2A and 3A at two straight lines, JL and KN. These two straight lines, representing location locus lines for objects of differing diameters, when produced, intersect at an apex A. The line which passes through the apex A, lies in the measurement plane, bisects the angle between the lines JA and KA, and lies between the edges 2A and 3A is herein defined as the centre line 1A of the main body 1.

A cylindrical measuring plunger 40 is mounted upon a linear bearing 41 of cylindrical outer form which is located within a bore 5 within the main body 1, the arrangement being such that the measuring plunger 40 is free to slide into the main body 1. Upon one end of the measuring plunger 40 is mounted a spherical probe 7 of tungsten carbide. The centre D of the spherical probe 7 lies within the measurement plane and is colinear with the centre line 5A of the bore 5. Over the other end of the measuring plunger 40 is a tubular thumbwheel 43 having a domed cap 44. The thumbwheel 43 is attached to the measuring plunger 40 by a threaded arrangement so that the axial position of the domed cap 44 with respect to the measuring plunger 40 may be adjusted by rotation of the thumbwheel 43.

A linear variable differential transformer (LVDT) displacement transducer has a body 45 and a measuring arm 46 which is rotatably mounted with respect to the body 45, and which is rotationally biassed by a light spring torque. The displacement indication from the displacement transducer depends upon the angular rotation of the measuring arm 46 with respect to the body 45. The body 45 of the displacement transducer is secured to the main body 1. The light spring torque causes the measuring arm 46 to contact the domed cap 44 and causes the spherical probe 7 to extend from the main body 1.

The main body 1 is rotatably mounted, by ball bearings, upon a support arm 11 which is in turn rotatably mounted upon a mounting block 12. In operation, the mounting block 12 is secured to a suitable fixed support adjacent to the test object 30. The support arm 11 is loaded by means of a spring 13 so that the edges 2A and 3A are pressed against the test object 30. The attachment of the mounting block 12 is adjusted so that the measurement plane is perpendicular to the cylindrical axis of the test object 30. The thumbwheel 43 is then adjusted until the spherical probe 7 is brought into contact with the test object 30. Adjustment of the thumbwheel 43 is continued further, lightly and partially to compress the spring loading of the measuring arm 46 and to bring the displacement transducer into its linear working region.

The geometrical relationships appertaining to this third embodiment are similar to those of the first embodiment.

In this third embodiment, axial movement of the domed cap 44 with respect to the measuring plunger 40 provides the gross movement required to accommodate test objects of various different diameters. The much smaller reciprocative movements of the spherical probe 7 with respect to the main body 1 caused by departures from roundness in a test object give rise to rotational displacement movements at the displacement transducer.

A fourth embodiment of the invention will now be described with reference to FIGS. 6, 7 and 8 of the accompanying drawings. Parts like or having a similar function to those of the first embodiment have been given like references.

Referring to FIGS. 6-8, a main body 1 of a measuring head is of aluminium alloy, upon which are secured edge-plates, 2 and 3. Each edge-plate has one straight, wear resisting edge, 2A and 3A respectively, of semi-circular cross-section, and is of tungsten carbide. The centres of curvature of these semi-circular edges 2A and 3A lie within the same plane M, termed the measurement plane. The measurement plane M intersects the semi-circular surfaces of the edges 2A and 3A at two straight lines, JL and KN. These two straight lines, representing location locus lines for objects of differing diameters, when produced, intersect at an apex A. The line which passes through the apex A, lies in the measurement plane M, bisects the angle between the lines JA and KA, and lies between the edges 2A and 3A is herein defined as the centre line 1A of the main body 1.

A linear variable differential transformer (LVDT) displacement transducer has a body 4 of cylindrical form and a cylindrical measuring plunger 6 which is free to slide axially into the body 4 upon a linear bearing 21 against a light spring force. Upon the free end of the measuring plunger 6 is mounted a spherical probe 7 of tungsten carbide. The cylindrical axis of the body 4 is colinear with the centre D of the spherical probe 7. The displacement indication from the displacement transducer depends upon the axial displacement of the spherical probe 7 with respect to the body 4 of the transducer.

The body 4 of the displacement transducer may slide within a close fitting bore 5 to which it may be fixed by means of a pinch screw 10. This arrangement allows occasional axial movement of the body 4 with respect to the bore 5 for calibration purposes. In contrast to the previous embodiments, the bore 5 is not in the main body 1 of the head, but in a carriage 20 which may slide along a linear bearing 18 in one arm of the main body 1. The centre line 5A of the bore 5 lies within the measurement plane M. The axial position of the carriage 20 is controlled by a thumbwheel 8 which provides fine positional adjustment by means of a threaded rod 9. The carriage 20 may be fixed relative to the main body 1 by means of a pinch screw 15.

The main body 1 is rotatably mounted, by ball bearings, upon a support arm 11 which is in turn rotatably mounted upon a mounting block 12. In operation, the mounting block 12 is secured to a suitable fixed support adjacent to the test object 30. The support arm 11 is loaded by means of a spring 13 so that the edges 2A and 3A are pressed against the test object 30. The attachment of the mounting block 12 is adjusted so that the measurement plane M is perpendicular to the cylindrical axis of the test object 30. The carriage 20 is then advanced along the translational axis of the linear bearing 18 by means of the thumbwheel 8 until the spherical probe 7 is brought into contact with the test object 30. Movement of the carriage 20 is then continued in the same direction, lightly and partially to compress the spring loading of the plunger 6 and to bring the displacement transducer to the centre of its linear working region. The carriage 20 is then fixed by means of the pinch screw 15. Only during calibration is the position of the body 4 of the displacement transducer changed with respect to the bore 5.

The points of contact between the measuring head and the test object 30 are B, C and G, which lie within the measurement plane M. Points B and C lie within the lines JA and KA respectively. The centre line 1A of the main body 1 passes through the centre O of the test object 30 and bisects the angle between the radii OB and OC. The translational axis of the linear bearing 18 is inclined at an angle indicated as GAMMA to the centre line 1A of the main body 1. The required angular offset of the point of contact G of the spherical probe 7 with respect to the centre line 1A of the main body 1 subtended at the centre of the test object 30 is indicated as DELTA. The centre line 5A of the bore 5 is inclined at this same angle DELTA to the centre line 1A of the main body 1, and lies in the measurement plane M.

The inclination GAMMA of the translational axis of the linear bearing 18 with respect to the centre line 1A of the main body 1 is determined by the following consideration. During calibration, which is described more fully in a subsequent paragraph, the measuring head is applied to a calibration cylinder, and the carriage 20 is positioned along the translational axis of the linear bearing 18 so that the centre line 5A of the bore 5 when produced passes through the centre of the calibration cylinder. The body 4 of the displacement transducer is then positioned and fixed with respect to the bore 5 so that the transducer is at the centre of its linear working region. To adjust the measuring head to accommodate a test object 30, the carriage 20 is repositioned along the translational axis of the linear bearing 18 so that the displacement transducer returns to the centre of its linear working region. The inclination GAMMA must be so chosen that when this operation has been performed then the centre line 5A of the bore 5 when produced passes through the centre of the test object 30.

The geometrical relationships indicated in FIGS. 6–8 and discussed above are those relating to a test object of perfectly cylindrical form. If the test object is not of perfectly cylindrical form, these geometrical relationships may not be exact. However, if the departures of the test object from perfectly cylindrical form are small, then their effect upon the geometrical relationships, and in particular upon the angular spacing of the points of contact, is small.

In this embodiment, movement of the carriage 20 along the linear bearing 18 provides the gross movement required to accomodate test objects of various different diameters. The much smaller movements of the spherical probe 7 with respect to the main body 1 caused by the departures from roundness of the test object 30 give rise to axial displacement movements at the displacement transducer. The colinear arrangement of the cylindrical axis of the body 4 and the centre D of the spherical probe 7 obviates the need to rotationally align the body 4 of the displacement transducer with the main body 1.

In comparison with the previous embodiments, an advantage of this fourth embodiment is that the cylindrical axis of the body 4 of the displacement transducer is colinear with the radius OG, and is thus perpendicular to the surface of the test object 30 at the point of contact G. Thus, the axial displacement of the spherical probe 7 with respect to the body 4 of the displacement transducer is largely unaffected by small movements of the spherical probe 7 away from a colinear position owing to imperfections in the linear bearing 21 which supports the plunger 6. Conversely, a disadvantage is that the actual subtended angles ALPHA and BETA are dependent upon the position of the carriage 20 with respect to the main body 1. Thus the displacement indication from the displacement transducer is used to indicate when the carriage 20 has been adjusted to the correct position so that the subtended angles are those desired. A calibration procedure is required prior to measurement. A specific embodiment of a calibration procedure is described, with reference to FIG. 6.

In this procedure, the measuring head is applied to an available calibration cylinder of known diameter. Use is made of the provision, both in the carriage 20 and the linear bearing 18, of bores 16 and 17 of equal diameter which may be made coaxial by appropriate positioning of the carriage 20 with respect to the main body 1 along the axis of the linear bearing 18. A close-fitting dowel (not shown) is inserted through both bores, 16 and 17, thus locating the carriage 20 so that the cylindrical axis 5A of the bore 5 intersects the centre line 1A of the main body 1 at a point coincident with the centre of the calibration cylinder. The carriage 20 is then fixed by means of the pinch screw 1s. The position of the body 4 of the transducer is then adjusted with respect to the bore 5 until the spherical probe 7 touches the calibration cylinder and the displacement transducer is brought to the centre of its linear working region. The body 4 of the displacement transducer is then fixed with respect to the carriage 20 by means of the pinch screw 10. The dowel and calibration cylinder are removed and the pinch screw 15 released. This completes the calibration procedure.

A fifth embodiment of the invention will now be described with reference to FIG. 9 of the accompanying drawings. Parts like or having a similar function to those of the fourth embodiment have been given like references.

Referring to FIG. 9, a main body 1 of a measuring head is of aluminium alloy, upon which are secured edge-plates, 2 and 3. Each edge-plate has one straight, wear resisting edge, 2A and 3A respectively, of semi-circular cross-section, and is of tungsten carbide. The centres of curvature of these semi-circular edges 2A and 3A lie within the same plane, termed the measurement plane. The measurement plane intersects the semi-circular surfaces of the edges 2A and 3A at two straight lines, JL and KN. These two straight lines, representing location locus lines for objects of differing diameters, when produced, intersect at an apex A. The line which passes through the apex A, lies in the measurement plane, bisects the angle between the lines JA and KA, and lies between the edges 2A and 3A is herein defined as the centre line 1A of the main body 1.

A linear variable differential transformer (LVDT) displacement transducer has a body 50 and a measuring spindle 51 which is rotatably mounted on the body 50 and is rotationally biassed by a light spring torque. Upon the measuring spindle 51 is a measuring arm 53 which may rotate about the measuring spindle 51, to which it may be fixed by means of a pinch screw 54. Upon the other end of the measuring arm 53 is mounted a spherical probe 7. The displacement indication from the displacement transducer depends upon the angular rotation of the measuring spindle 51 with respect to the body 50.

The body 50 of the displacement transducer is secured to a carriage 20 which may slide along a linear bearing 18 in one arm of the main body 1. The axial position of the carriage 20 is controlled by a thumbwheel 8 which provides fine positional adjustment by means of a threaded rod 9. The carriage 20 may be fixed relative to the main body 1 by means of a pinch screw 15. The centre D of the spherical probe 7 lies in the measurement plane.

The main body 1 is rotatably mounted, by ball bearings, upon a support arm 11 which is in turn rotatably mounted upon a mounting block 12. In operation, the mounting block 12 is secured to a suitable fixed support adjacent to the test object 30. The support arm 11 is loaded by means of a spring 13 so that the edges 2A and 3A are pressed against the test object 30. The attachment of the mounting block 12 is adjusted so that the measurement plane is perpendicular to the cylindrical axis of the test object 30. The carriage 20 is then advanced along the translational axis of the linear bearing 18 by means of the thumbwheel 8 until the spherical probe 7 is brought into contact with the test object 30. Movement of the carriage 20 is then continued in the same direction, lightly and partially to compress the spring biassing of the measuring spindle 51 and to bring the displacement transducer to the centre of its linear working region. The carriage 20 is then fixed by means of the pinch screw 15. Only during calibration is the angular position of the measuring arm 53 changed with respect to the measuring spindle 51.

The points of contact between the measuring head and the test object 30 are B, C and G, which lie within the measurement plane. Points B and C lie within the lines JA and KA respectively. The centre line 1A of the main body 1 passes through the centre O of the test object 30 and bisects the angle between the radii OB and OC. The translational axis of the linear bearing 18 is inclined at an angle indicated as GAMMA to the centre line 1A of the main body 1. The required angular offset of the point of contact G of the spherical probe 53 with respect to the centre line 1A of the main body 1 subtended at the centre of the test object 30 is indicated as DELTA.

The inclination GAMMA of the translational axis of the linear bearing 18 with respect to the centre line 1A of the main body 1 is determined by the following consideration. During calibration, which is described more fully in a subsequent paragraph, the measuring head is applied to a calibration cylinder, and the carriage 20 is positioned along the translational axis of the linear bearing 18 so that the rotational axis Q of the measuring spindle 51 is at a known position with respect to the main body 1. The measuring spindle 51 is then rotationally positioned and fixed with respect to the measuring arm 53 so that the spherical probe 7 is contacted to the calibration cylinder and the displacement transducer is at the centre of its linear working region. The form of the measuring arm 53 and spherical probe 7, in particular the diameter of the spherical probe 7 and the distance DQ between its centre D and the rotational axis Q of the measuring spindle 51 are such that the required angular offset DELTA is achieved. To adjust the measuring head to accommodate a test object 30, the carriage 20 is repositioned along the translational axis of the linear bearing 18 so that the displacement transducer returns to the centre of its linear working region. The inclination GAMMA must be so chosen that when this operation has been performed then the angular offset remains at the required value DELTA.

The geometrical relationships indicated in FIG. 9 and discussed above are those relating to a test object of perfectly cylindrical form. If the test object is not of perfectly cylindrical form, these geometrical relationships may not be exact. However, if the departures of the test object from perfectly cylindrical form are small, then their effect upon the geometrical relationships, and in particular upon the angular spacing of the points of contact, is small.

In this embodiment, movement of the carriage 20 along the linear bearing 18 provides the gross movement required to accomodate test objects of various different diameters. The much smaller movements of the spherical probe 7 with respect to the main body 1 caused by the departures from roundness of the test object 30 give rise to rotational displacement movements at the displacement transducer.

A disadvantage of this fifth embodiment, as with the fourth embodiment, is that the actual subtended angles ALPHA and BETA are dependent upon the position of the carriage 20 with respect to the main body 1. Thus the displacement indication from the displacement transducer is used to indicate when the carriage 20 has been adjusted to the correct position so that the subtended angles are those desired. A calibration procedure is required prior to measurement. A specific embodiment of a calibration procedure is described, with reference to FIG. 9.

In this procedure, the measuring head is applied to an available calibration cylinder of known diameter. Use is made of the provision, both in the carriage 20 and the linear bearing 18, of bores 16 and 17 of equal diameter which may be made coaxial by appropriate positioning of the carriage 20 with respect to the main body 1 along the axis of the linear bearing 18. A close-fitting dowel (not shown) is inserted through both bores, 16 and 17, thus locating the carriage 20 so that the rotational axis Q of the measuring spindle 51 is at a known position with respect to the main body 1. The carriage 20 is then fixed by means of the pinch screw 15. The measuring spindle 51 is then rotationally positioned with respect to the measuring arm 53 so that the spherical probe 7 is contacted to the calibration cylinder and the displacement transducer is at the centre of its linear working region. The measuring spindle 51 is then fixed with respect to the measuring arm 53 by means of the pinch screw 54.

The dowel and calibration cylinder are removed and the pinch screw 15 released. This completes the calibration procedure.

I claim:

1. Apparatus for measuring the roundness of an object which is relatively rotated as part of the measuring operation, the apparatus comprising a head having a pair of location means angularly related such that when brought into contact with the peripheries of nominally round objects of different diameters points of contact between said location means and said objects will progress with respect to the head along straight, non-parallel location locus lines tangential to each object, means for aligning the head relative to an object to be measured such that said location locus lines lie and intersect in a common measurement plane to which the axis of relative rotation is perpendicular and at least one sensing means which is adjustable relative to the head along an axis of adjustment in or parallel to the measurement plane, said axis of adjustment being transverse to the bisector of the location locus lines, the sensing means having a sensing member mounted thereon to detect the periphery of an object being measured at a predetermined measurement point when said object is in contact with said location means and aligned, the arrangement being such that measurement points of objects of different diameters progress along a straight measurement locus line parallel to or coincident with said axis of adjustment and passing through the intersection of said location locus line.

2. Apparatus as claimed in claim 1, wherein the sensing means is disposed between the location means within the acute or obtuse angle subtended by the location means at the centre of an object being measured.

3. Apparatus as claimed in claim 1 wherein the sensing means contacts the object at the measurement point and is responsive thereto.

4. Apparatus as claimed in claim 1 wherein the sensing means incorporates a probe which is convex about an axis normal to the measurement plane where the probe is adapted to contact the object at the measurement point.

5. Apparatus as claimed in claim 1 wherein the sensing means comprises a sensing device on the head supporting a sensing member upon a bearing to allow limited reciprocative movement and the sensing member is spring biassed so as, in use, to contact a probe of the sensing member to the object.

6. Apparatus as claimed in claim 5 wherein the bearing supporting the sensing member is a linear bearing.

7. Apparatus as claimed in claim 6 wherein the linear bearing has its linear axis parallel to or coincident with the measurement locus line.

8. Apparatus as claimed in claim 1 wherein the sensing means comprises a sensing device linked to a sensing member which is mounted upon a linear bearing upon the head to allow reciprocative movement in a direction parallel to the measurement locus line, this sensing member being spring biassed so as, in use, to contact a probe of the sensing member to the object.

9. Apparatus as claimed in claim 1 wherein the sensing means comprises a sensing device linked to a sensing member which is mounted upon a bearing upon a support member, the support member being adjustable with respect to the head along an axis parallel to or coincident with the measurement locus line, the bearing allowing limited reciprocative movement of the sensing member, the sensing member being spring biassed so as, in use, to contact a probe of the sensing member to the object.

10. Apparatus as claimed in claim 1 wherein the sensing means is responsive to the proximity of the measuring point.

* * * * *